(12) United States Patent
Rabault et al.

(10) Patent No.: US 12,329,178 B2
(45) Date of Patent: Jun. 17, 2025

(54) NON-BLOOM COMESTIBLE PRODUCT

(71) Applicant: Generale Biscuit, Clamart (FR)

(72) Inventors: Jean-Luc Rabault, Clamart (FR); François Belouin, Clamart (FR)

(73) Assignee: Generale Biscuit, Clamart (FR)

( * ) Notice: Subject to any disclaimer, the term of this patent is extended or adjusted under 35 U.S.C. 154(b) by 330 days.

(21) Appl. No.: 16/650,143

(22) PCT Filed: Oct. 26, 2018

(86) PCT No.: PCT/EP2018/079476
§ 371 (c)(1),
(2) Date: Mar. 24, 2020

(87) PCT Pub. No.: WO2019/081745
PCT Pub. Date: May 2, 2019

(65) Prior Publication Data
US 2020/0275676 A1    Sep. 3, 2020

(30) Foreign Application Priority Data

Oct. 27, 2017  (EP) .................................... 17306481

(51) Int. Cl.
*A23G 1/54*   (2006.01)
*A21D 13/068*   (2017.01)
(Continued)

(52) U.S. Cl.
CPC ............. *A23G 1/54* (2013.01); *A21D 13/068* (2013.01); *A21D 13/17* (2017.01); *A21D 13/19* (2017.01);
(Continued)

(58) Field of Classification Search
CPC ........ A23G 1/54; A23G 1/305; A21D 13/068; A21D 13/17; A21D 13/19; A21D 13/24; A21D 13/28
See application file for complete search history.

(56) References Cited

U.S. PATENT DOCUMENTS 5,762,990 A   6/1998   Eiko
5,925,399 A   7/1999   Cheng
(Continued)

FOREIGN PATENT DOCUMENTS

CA   2853526   5/2013
CN   101909457   12/2010
(Continued)

OTHER PUBLICATIONS

International Search Report and Written Opinion of the International Searching Authority, date of mailing Nov. 7, 2018 for International Application No. PCT/EP2018/077641 (13 pgs.).
(Continued)

*Primary Examiner* — Katherine D Leblanc
(74) *Attorney, Agent, or Firm* — Fitch, Even, Tabin & Flannery LLP

(57) ABSTRACT

The present invention provides a composite comestible product comprising distinct first and second components, wherein the first component has a total fat content comprising a randomly interesterified fat, the randomly interesterified fat having a saturated fat content of from 35 to 55 wt % by weight of the randomly interesterified fat, wherein the total fat content comprises from 20 to 50 wt % saturated fat and less than 3 wt % trans fatty acids by weight of the total fat content, and wherein the second component is a chocolate component comprising one or more sources of cocoa butter (CB) or cocoa butter equivalent (CBE).

18 Claims, 1 Drawing Sheet

(51) Int. Cl.
  *A21D 13/17* (2017.01)
  *A21D 13/19* (2017.01)
  *A21D 13/24* (2017.01)
  *A21D 13/28* (2017.01)
  *A23G 1/30* (2006.01)
  *A23G 1/38* (2006.01)

(52) U.S. Cl.
  CPC ............ *A21D 13/24* (2017.01); *A21D 13/28* (2017.01); *A23G 1/305* (2013.01); *A23G 1/38* (2013.01); *A23V 2002/00* (2013.01)

(56) References Cited

U.S. PATENT DOCUMENTS

| | | | |
|---|---|---|---|
| 6,773,744 | B1 | 8/2004 | Ward |
| 2005/0142275 | A1* | 6/2005 | Bach ................ A23G 1/52 426/601 |
| 2009/0029024 | A1 | 1/2009 | McNeill |
| 2009/0226593 | A1 | 9/2009 | Han |
| 2010/0029766 | A1 | 2/2010 | Barclay |
| 2010/0297293 | A1 | 11/2010 | Dalemans |
| 2011/0008499 | A1 | 1/2011 | Akahane |
| 2012/0237662 | A1 | 9/2012 | Wang |
| 2017/0258106 | A1* | 9/2017 | Rabault ............. A23D 9/013 |

FOREIGN PATENT DOCUMENTS

| | | |
|---|---|---|
| CN | 101969783 | 2/2011 |
| CN | 103533840 | 1/2014 |
| EP | 0521549 | 1/1993 |
| EP | 0815738 | 1/1998 |
| EP | 1287825 | 3/2003 |
| EP | 2014174 | 1/2009 |
| EP | 2340720 | 7/2011 |
| JP | 7155106 | 6/1995 |
| JP | 8242768 | 9/1996 |
| JP | 2005507028 | 3/2005 |
| JP | 2006115724 | 5/2006 |
| JP | 2006288307 | 10/2006 |
| JP | 2007143433 | 6/2007 |
| JP | 2008228641 | 10/2008 |
| JP | 2010506959 | 3/2010 |
| JP | 2010104325 | 5/2010 |
| JP | 2011500074 | 1/2011 |
| WO | 9412045 | 6/1994 |
| WO | 96017528 | 6/1996 |
| WO | 2000030463 | 6/2000 |
| WO | 2001043558 | 6/2001 |
| WO | 03067999 | 8/2003 |
| WO | 2004017745 | 3/2004 |
| WO | 2006037341 | 4/2006 |
| WO | 2006131539 | 12/2006 |
| WO | 2007144132 | 12/2007 |
| WO | 2008010543 | 1/2008 |
| WO | 2009007101 | 1/2009 |
| WO | 2009116396 | 9/2009 |
| WO | 2012032945 | 3/2012 |
| WO | 2014034601 | 3/2014 |
| WO | 2017110649 | 6/2017 |

OTHER PUBLICATIONS

Milk and Milk Products/Milk powder/whole milk powder, Japan Food Standard Ingredients Table 2020 edition (Hachiban), cited by Japanese Examiner as Details of food, all powdered milk, 2015 years, [search on Mar. 8, [online], ], Internet URL:https://fooddb.mext.go.jp/details/details.pl?ITEM_NO=13_13009_7, and the Internet <Reiwa 3(2021)> (4 pgs.).
Notice of Reasons for Refusal, dated Mar. 19, 2021, Japanese Patent Application No. 2020-517964 (20 pgs.).
Notice of Third Party Observations, Japanese Patent Application No. 2020-517964, dated Jul. 20, 2021 (2 pg.).
Encyclopedia of Food Efficacy, Edited by Editorial Board of TCM Hall, Heilongjiang Science and Technology Press, First Edition, First printing, p. 194 (2 pgs).
Notice of Reasons for Refusal, dated Dec. 1, 2021, Japanese Patent Application No. 2020-517964, with English translation (8 pgs.).
Notification of the First Office Action, date of mail Aug. 19, 2022; Chinese Patent Application No. 201880063139.7, with English translation (18 pgs.).
Notification of the Second Office Action, date of of mail Feb. 5, 2023; Chinese Patent Application No. 201880063139.7, with English translation (20 pgs.).

* cited by examiner

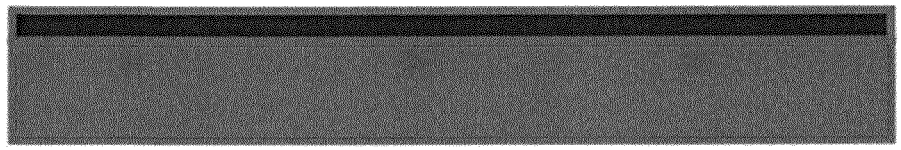

NON-BLOOM COMESTIBLE PRODUCT

CROSS REFERENCE TO RELATED APPLICATIONS

This application is a U.S. national phase application of International Application No. PCT/EP2018/079476, filed Oct. 26, 2018, which claims benefit from European Application 17306481.7, filed Oct. 27, 2017, which are each hereby incorporated herein by reference in their entirety.

The present disclosure relates to a comestible product which contains a chocolate component in contact with a filling or a bakery portion. It has been found that prior art products of this type may suffer from unwanted fat bloom on a surface of the chocolate component and/or excessive saturated fat content. The present disclosure relates to chocolate-containing comestible products, such as cookies, biscuits, soft cakes and filled chocolate shells, which do not suffer from this unsightly bloom and which are, relative to the prior art, healthier (especially lower in saturated and/or in trans fatty acids) for the same efficiency on avoiding fat bloom.

Fat bloom is the consequence of uncontrolled recrystallisation of fats in comestibles. Fat bloom is well-known in chocolate and chocolate compounds, where fat migration and the polymorphism of cocoa butter (CB) or cocoa butter equivalents (CBEs) lead to the uncontrolled recrystallisation of fat. The recrystallised fat is often visible to the naked eye, resulting in an unpleasant or mouldy appearance.

Fat bloom in chocolate and chocolate compounds is a complex problem and it is often difficult to identify the exact cause. However, some factors are known to increase the likelihood of bloom. Increasing the mobility of the fat in the chocolate or creating contact between the chocolate or chocolate compound and another high-fat material having a different (and/or more liquid) fat composition is known to promote fat bloom due to undesirable, often inevitable fat migration. The inclusion of chocolate or chocolate compounds in baked goods, or enrobing fillings with chocolate to form confectionery products, leads to such contact between the chocolate or chocolate compound and the other fat-containing materials. This may result in bloom on the chocolate or chocolate compound surface and even on the non-chocolate surfaces.

One known method of limiting fat bloom is to introduce a boundary layer between the chocolate and non-chocolate layers. However, such methods are often costly due to the technical difficulties associated with producing such a layer. Additionally, such layers may lead to unpleasant feel or taste of the chocolate product, thereby reducing the desirability of said product. They are also often inefficient in bakery products, where it is nearly impossible to obtain a continuous boundary layer without using a very thick layer.

Other known methods of limiting fat bloom involve adding specific fat or oil compositions to the chocolate. However, the options for such modification of chocolate recipes are limited due to the strictly regulated nature of chocolate. Additionally, many of the allowable modifications are either costly, increase cholesterol or lead to softening of the chocolate. Attempts have also been made to limit fat migration from the non-chocolate layer to the chocolate layer by altering the fat composition of the non-chocolate layer. The known fats suitable for this purpose all have significant downsides; they tend to be expensive or lead to other unpleasant characteristics of the non-chocolate layer. Moreover, some of these known fats are unhealthy (because they are high in saturated fat and/or containing trans fatty acids due to partially hydrogenation), or are based on animal fats such as tallow or lard.

Some antibloom fats that can be used in contact with chocolate are as follows:
Partly hydrogenated oils containing a lot of trans fatty acids (FA) are very efficient and enable the saturated fat (sat fat) content to be limited, but trans FA are now banned by nutritionists and refused by consumers for their possible implication in heart disease;
(milk) butter/anhydrous milk fat, but it is very expensive, contains cholesterol, gives a specific taste and is often not hard enough for fillings nor sufficiently heat resistant (for instance, when exposed to 29° C.);
cocoa butter or cocoa butter equivalent (CBE), but these require tempering (not possible in a biscuit and make hard fillings with a complex crystallization step) and are very expensive. They are often mixed with anhydrous (milk) butter to have a softer texture in fillings, but it usually still require tempering, so is not applicable for biscuits base cakes;
more complex non hydrogenated antibloom fats, sold for instance by Fuji (Ertifil AB range), but these fats are usually both expensive (because made from specialties using some part of lauric fats mixed with palm oil) and rich in saturated fats (55 to 80%). In case of use in soft baked goods, containing water, if there is some lipase trace in the raw materials (for instance in cocoa powder), there is a risk of bad off flavor due to free lauric fatty acid (obtained after hydrolysis of the TAG);
very solid fats (such as palm stearin, but they are very saturated (typically >66% sat fat) and not pleasant organoleptically (not melting/waxy, too hard for soft cakes products etc.).

Reducing the saturated fat content usually increases fat mobility, increasing the bloom risk after migration into the chocolate.

US 2015/0223482 A1 discloses a combined confectionary that comprises a combination of a chocolate with a baked confectionary.

US 2005/0142275 A1 discloses non-lauric, non-trans, non-temper fat compositions.

WO 2012/108377 A1 discloses a plasticized emulsified fat and oil composition for breadmaking and mixing.

U.S. Pat. No. 6,277,433 B1 discloses a fat composition having a triglyceride composition, corresponding with a randomized, interesterified fat.

It would therefore be desirable to provide a chocolate-containing comestible product which resists bloom formation during storage at room temperature, which tackles the drawbacks associated with the prior art, or at least provides a commercial alternative thereto.

According to a first aspect there is provided a composite comestible product comprising distinct first and second components,
  wherein the first component has a total fat content comprising a randomly interesterified fat, the randomly interesterified fat having a saturated fat content of from 35 to 55 wt % by weight of the randomly interesterified fat,
  wherein the total fat content comprises from 20 to 50 wt % saturated fat and less than 3 wt % trans fatty acids by weight of the total fat content, and
  wherein the second component is a chocolate component comprising one or more sources of cocoa butter (CB) or cocoa butter equivalent (CBE).

The present inventors have found that randomly interesterified fats are effective anti-bloom fats, preventing bloom from occurring during storage at room temperature, even at low saturated fat content. This was unexpected because fats having a low saturated fat content tend to be more mobile, thereby increasing the likelihood of bloom forming on the chocolate component. Thus, the present disclosure provides fat compositions for use in contact with chocolate that inhibit bloom formation on the surface of the chocolate, without requiring high levels of saturated fat. Moreover, the present inventors have found that randomly interesterified fats are effective anti-bloom fats even at low concentrations of trans fatty acids (TFAs). This is again surprising since TFAs are known to have a high compatibility with CB. Moreover, the present inventors have found that randomly interesterified fats are effective anti-bloom fats even at low concentrations of short chain saturated FA (C12 and lower). Furthermore, the claimed fat composition has been found to have a similar melting profile and crystallisation speed to palm oil, making it suitable for confectionary applications.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention relates to a composite comestible product. By comestible it is meant an edible foodstuff intended for human consumption. By composite it is meant a product comprising a plurality of distinct (i.e. discrete) components.

The composite comestible product comprises distinct first and second components. The first component will be described in more detail below. The second component is a chocolate component comprising one or more sources of cocoa butter (CB) or cocoa butter equivalent (CBE). It will therefore be appreciated that the chocolate component as described herein may in fact be a "chocolate compound" component that shares its physical properties with chocolate but without falling under the strict regulatory definition of chocolate itself. CB is well-known and may be found as a component of composite ingredients including cocoa powder, cocoa liquor (also called cocoa mass), and chocolate. The second component (which may, for example, take the form of chocolate chips or a chocolate coating or a chocolate shell), may contain any conventional level of CB or CBE suitable for forming a desired final product. Preferably, the CB and/or CBE is present in a total amount of from 18 to 50 wt % by weight of the second component, more preferably from 20 to 42 wt %, still more preferably 20 to 35 wt % and even more preferably 24 to 33 wt %. Unless otherwise specified, all percentages herein are by weight.

CBEs are well-known in the art and their use in food stuffs, particularly confectionery, is increasing as the global demand for cocoa butter exceeds its production. CBEs are defined in scientific terms in various food standards documents and in some jurisdictions a percentage of cocoa butter equivalents may replace cocoa butter without losing the right to describe the product as chocolate. European Union regulations define CBEs as: non-lauric vegetable fats, rich in symmetrical monounsaturated triglycerides; miscible, in any proportion, with cocoa butter; compatible with its physical properties (melting point, crystallisation temperature, melting rate and need for tempering phase, i.e. they are polymorphic); obtained by the processes of refining and/or fractionation, which excludes enzymatic modification of the triglyceride structure or any other interesterification. Common sources of CBEs include shea, illipe, sal, kokum gurgi, mango kernels and palm oils. CBE may be used to replace some or all of the cocoa butter in comestible ingredients. CBEs are distinct from Cocoa Butter Replacers CBR and Cocoa Butter Substitutes CBS, which are both non-tempered fats well-known in the art.

Although CBE are sometimes said to have physical properties equivalent to cocoa butter, there are soft and hard CBEs. Cocoa Butter Improvers (CBI) is a specific class of CBE, being much harder than standard CB itself, and melting at a higher temperature and are used to improve temperature tolerance of chocolate. There are also fats which have the same physical and chemical characteristics of CB, CBE or CBI, but are obtained in a way not allowed by the various local chocolate regulations/Codex (because of other vegetable origin, due to too much specific minor lipid components or due to the use of hydrogenation and/or interesterification for instance; or produced by genetically modified algae): if they are used, even at less than 5%, the product cannot be labelled chocolate.

The common point of these CB, CBE/CBI is that they are called tempered fats. These are polymorphic fats stable in beta crystal form. Tempering is mandatory to allow for a quick crystallisation to form small fat crystals and in a stable beta form. The use of any other polymorphic fat, i.e. palm mid fractions would also exhibit the same problem described herein.

The term CBE as used herein encompasses CBIs and the fats which have physical and chemical characteristics similar to CBE but do not comply with regulations to be called CBE or for being permitted in the relevant chocolate standard of identity. It also includes fat-rich products/components rich in tempered fats, but being less purified fractions than CBE like palm mid fractions or shea stearin. Preferably the terms CBE and CB as used herein are given their strict definition.

The one or more sources of CB or CBE preferably comprise less than 5 wt % partially hydrogenated oil based on the total fatty acids present in the one or more sources of CB or CBE, more preferably less than 1 wt %. Most preferably, the one or more sources of CB or CBE comprise no or substantially no partially hydrogenated oil.

The one or more sources of CB or CBE preferably comprise less than 5 wt % trans fatty acids based on the total fatty acids present in the one or more sources of CB or CBE, more preferably less than 1 wt %, and preferably at least 0.1 wt %. Most preferably, the one or more sources of CB or CBE comprise no or substantially no trans fatty acids.

Preferably, the second component has a total content of $SU_2$ and $U_3$ triglycerides of less than 10 wt % based on the total triglycerides present in the second component, more preferably less than 8 wt %, still more preferably from 1 to 6 wt %. S denotes a saturated fatty acid having a carbon number of at least 16, U denotes an unsaturated fatty acid having a carbon number of at least 16, $SU_2$ denotes a triglyceride configured such that one molecule of S and two molecules of U are bonded (irrespective of order), and $U_3$ denotes a triglyceride configured such that three molecules of U are bonded. It is to be understood that the term "total triglycerides" in the context of this feature refers to those triglycerides bearing three fatty acid chains, each of these fatty acid chains having a carbon number of at least 16. Methods of measuring the total content of $SU_2$ and $U_3$ triglycerides are well known to those skilled in the art. For example, the total content of $SU_2$ and $U_3$ triglycerides may be measured by capillary gas chromatography or by high resolution gas liquid chromatography. In particular, the total content of $SU_2$ and $U_3$ triglycerides may be measured by the standard "ISO/TS 17383:2014—'Determination of the triacylglycerol composition of fats and oils—Determination by capillary gas chromatography'". Alternatively, the total content of $SU_2$ and $U_3$ triglycerides may be measured at Reading Scientific Services Ltd (Reading, UK) by "reference method TM-379—triglycerides by high resolution gas liquid chromatography (GLC)".

Preferably, the CB and/or CBE is present in a total amount of at least 90 wt % by weight of the total vegetable fat content of the second component, more preferably at least 95 wt %. Preferably, the CB/and/or CBE is present in a total amount of at most 99.9 wt % by weight of the total vegetable fat content of the second component.

For the avoidance of doubt, the second component does not form a part of the first component or vice versa when considering the amount of ingredients in each of the two components. Preferably, the first component is a non-chocolate component. In other words, the first component preferably comprises CB and/or CBE in a total amount of less than 5 wt %, more preferably less than 1 wt %, still more preferably less than 0.5 wt %, and preferably at least 0.1 wt % by weight of the first component.

The first component and the second component are preferably in direct contact. In other words, the composite comestible product does not include a barrier layer or component disposed between the first and second components.

Preferably, the second component forms at least a portion of an outer surface of the comestible product, the outer surface having a colour and/or size such that the presence of any fat bloom thereon would be readily discernible. Preferably, no fat bloom is discernible (with the naked eye in good natural light conditions) on a surface of the chocolate component for at least 4 weeks of storage at 18 and 25° C. (parallel tests at both isothermal temperatures+/−0.5° C.), more preferably no fat bloom is discernible for at least 8 weeks at both temperatures and even more preferably for at least 12 weeks at both temperatures. Preferably, no fat bloom is also discernible for 6 months, preferably after 9 months, at 18° C. (with the naked eye in good natural light conditions).

Preferably, no fat bloom is discernible on a surface of the chocolate component for at least 3 months during storage in a sealed and airtight package at a temperature from 18 to 25° C., more preferably at least 6 months, still more preferably at least 9 months.

Preferably, the first component forms a bakery portion or a filling.

A bakery portion is one made by the cooking, preferably by baking in an oven, of a dough (typically viscous) or a batter (generally more liquid). Depending on the moisture content of the bakery portion and/or the inclusion of polyols, the bakery portion can be considered as:

"dry" (typically having less than 5 wt % moisture and are hard and crunchy/crispy). Such dry products are referred to herein "biscuits and cookies"; or "soft" (typically containing more than 5 wt % moisture, but having an Aw of below 0.85). Such soft portions often include added polyols, in particular if their Aw is below 0.8. The measurement of Aw is well known in the art. By soft it is meant that the product can be very soft or just not crunchy/crispy. Such soft products are referred to herein "soft cakes".

In some embodiments, the bakery portion is a continuous bakery portion. Comestible products including a continuous bakery portion are well-known and include in particular dry biscuits, preferably biscuits (generic name in Europe), cookies (generic name in US), crackers, wafers, and baked granola bars. The comestible products further include soft cakes which include preferably cakes, cupcakes, sponge cakes, soft bars, brownies, but also brioche, croissants, buns, muffins, Swiss rolls, patisserie products such as tarts, plaits, and swirls, pain au chocolat, macaroons, flapjacks, doughnuts, pies, scones, éclairs, Mille-feuille, puddings, flans, tortes, pancakes and profiteroles.

The first component and the second component may form first and second adjacent layers respectively, the first component preferably forming a bakery portion. Preferably, the first and second adjacent layers are continuous. Alternatively, the second layer may form discrete islands on a surface of the first layer or vice versa. For example, the second layer may form a slab, a bar or discrete islands (such as drops) on a surface of a continuous bakery portion.

In embodiments where the first component forms a filling, the first component and the second component preferably form first and second adjacent layers respectively. Preferably, the first and second adjacent layers are continuous. For example, the second layer may form a shell at least partially enrobing the filling.

Accordingly, the composite comestible product may be in the form of a filled, layered or sandwich product. By a filled bakery product it is meant that the bakery product is provided with a filling or coating layer on at least one surface, or with a filling or coating layer within a cavity (open or closed) or with a filling or coating layer linking two or more bakery products together. For example, a sandwich biscuit may be considered as filled because the filling is provided between two biscuit portions.

In embodiments where the first component forms a continuous bakery portion, the second component may alternatively form one or more discrete inclusions within the continuous bakery portion. Preferably, the one or more discrete inclusions are chocolate chips or chocolate compound chips. For example, the comestible product may take the form of a chocolate chip cookie where the discrete chocolate chips are surrounded by the continuous bakery portion of the baked cookie derived from a dough formulation. As will be appreciated, the inclusions may be within the continuous bakery portion but still present on and visible at a surface of the comestible product. Preferably the discrete inclusions have an average size of from 1 to 15 mm, more preferably from 2 to 10 mm and most preferably from 3 to 8 mm.

Chocolate chips, as referred to herein include any solid chocolate or "chocolate compound" piece inclusion, and may be referred to, for example, as pieces, chunks, chips, drops, or vermicelli. The chocolate chips comprise a source of CB and/or CBE, preferably wherein the source of CB and/or CBE is present in a total amount of from 18 to 40 wt % by weight of the chocolate chips, more preferably from 18 to 34 wt %, still more preferably from 18 to 29 wt %, and most preferably from 20 to 28 wt %.

A chocolate compound as referred to herein may be used for chocolate-like inclusions or coatings/layers. A chocolate compound is an imitation of chocolate but which cannot be called chocolate since it does not fulfil the regulations required for the chocolate standard of identity. Chocolate compounds are usually cheaper than chocolate. Quite often, this reduction in cost is due to the use of different fats. There are three main groups of chocolate compounds, differing by the type of fat used: CBE compounds (which, like chocolate, must be tempered), and on the other hand cocoa butter replacers (CBR) and cocoa butter substitutes (CBS) which do not require tempering. Chocolate compound is a technical term and the final name for the consumer varies depending on country or suppliers (imitation of chocolate, "pâte à glacer" in French, cocoa coating or glazing, etc.).

The chocolate component can further comprise antibloom additives such as sorbitan monostearate or sorbitan tristearate, but preferably do not contain such ingredients to keep a cleaner label.

In embodiments where the first component forms a bakery portion, the bakery portion preferably has a total fat content of from 7 to 30 wt % by weight of the bakery portion, more preferably from 9 to 27 wt %, still more preferably from 9 to 25%, still more preferably from 9 to 23 wt %, still more preferably from 9 to 22%, still more preferably from 12 to 22 wt % and most preferably from 13 to 18 wt %. In embodiments where the first component forms a continuous bakery portion, the continuous bakery portion preferably forms the majority of the product, i.e. at least 50 wt % thereof (preferably at least 60%, more preferably at least 70% and still more preferably at least 75 wt % thereof) and typically forms the supporting structure (such as a biscuit portion in a chocolate biscuit). The second component preferably forms the remainder.

In other embodiments, the second component forms a continuous portion, and the first component is a bakery portion and forms one or more discrete bakery inclusions.

Preferably the moisture content of the comestible product, especially for biscuits and cookies, is less than 6 wt % of the product, more preferably less than 4 wt %, and preferably at least 0.5 wt %. For soft cakes, brownies and the like, the moisture content is preferably less than 25 wt %, more preferably from 10 to 25 and even more preferably from 10 to 18 wt %.

As noted above, the first component preferably forms a continuous bakery portion or a filling. A filling is one which has a desirable flavour and mouth feel. Such fillings typically include fat, sugar and a flavouring, such as a chocolate, hazelnut, coffee, strawberry, mint or vanilla flavouring. It can also be a savoury filling, with for instance, tomato or cheese powders and flavours. Such flavourings are well known in the art. Preferably, the filling contains less than 10 wt % flour by weight of the filling, more preferably less than 5 wt %, even more preferably less than 3 wt % and still more preferably less than 1 wt %.

The filling described herein is prepared from a fat composition, together with at least one powdered food ingredient and, optionally water or water-containing ingredients (such as liquid glucose syrup, honey, concentrated milk and the like). The presence of added water (and optionally other liquid hydrophilic ingredients within the aqueous phase) will depend on whether the filling is an emulsion-based filling or an anhydrous filling.

Preferably the filling composition is prepared by adding the at least one powdered food ingredient into the at least partially melted fat composition.

In embodiments where the first component forms a filling, the first component and the second component preferably form first and second adjacent layers respectively. Preferably, the first and second adjacent layers are continuous. For example, the second layer may form a shell at least partially enrobing the filling.

In embodiments where the first component forms a filling, the filling may be an anhydrous filling or an emulsion-based filling, preferably an anhydrous filling. An anhydrous filling is any concentrated suspension of solid particles ("dry" powdered ingredients) in a continuous fat phase which is not a water-in oil emulsion (the suspension may be more readily seen when the fat is melted). When the fats and oils making the continuous phase are melted and not intentionally aerated, the filling described herein preferably has a homogeneous texture, either liquid or more viscous (but still pumpable), such as a batter or a dough. The filling is not powdery or crumbly (such as a wet sand texture). Anhydrous fillings do not include added water, either directly or indirectly (for instance through liquid glucose syrup or liquid honey for instance). An anhydrous filling contains substantially no water (i.e. has a moisture content of less than 6 wt %, preferably less than 3 wt %) and most of its water is bound within its solid particles, like vegetable fragments (cocoa powder, starch and the like), dried powders (milk and the like), or crystals with crystallisation water (dextrose monohydrate, lactose monohydrate and the like). An anhydrous filling contains substantially no added liquid, polyols such as glycerol, propylene glycol and the like (i.e. less than 3 wt %, preferably less than 1 wt %, more preferably 0). Anhydrous fillings typically have a water activity (Aw) of less than 0.6, preferably less than 0.5, and are frequently used in filled chocolate because they do not soften the chocolate.

The water activity (Aw) of a product is a notion which is well known in the food industry field. This value measures the availability of water in a sample. In most cases, this water activity is not proportional to the water content of the product.

Methods for measuring Aw of a product are known to the person skilled in the art. For example, it can be measured with an Aqualab CX-2 or series 3, or a Novasina. All Aw values indicated hereafter are measured at 25±1° C.

Common anhydrous fillings may include yoghurt or live cultures to provide additional taste and health benefits.

An emulsion-based filling, which contains fats and water (or other liquid anhydrous but hydrophilic food grade ingredients such as liquid anhydrous polyols: glycerol, propylene glycol and the like), is a dispersion comprising at least one lipid phase and at least one aqueous (hydrophilic) phase. The lipid phase (which is herein also referred to as a fat phase) can be predominantly solid or predominantly liquid (or entirely solid or entirely liquid) depending on temperature. The emulsion can further comprise solid particles, like insoluble particles (cocoa powder, non-gelatinised starch, or the like) or icing sugar, for instance, if the concentration exceeds the maximum solubility. Emulsion fillings for products having a shelf life of several months (non-frozen) typically have an Aw 0.50-0.85. They are frequently used in chocolate shells. For a shorter shelf life or when a suitable preservation system is used, the Aw of the filling according to the invention could be higher, for example from 0.85 to 0.93.

The preparation of emulsion fillings includes adding water or liquid water containing ingredients (and/or liquid anhydrous hydrophilic ingredients such as anhydrous liquid polyols) and usually emulsifiers to stabilise the emulsion. These fillings may include a continuous lipid phase (with a dispersed hydrophilic phase), or a continuous hydrophilic phase (with a dispersed lipid phase) or bicontinuous phases (for instance with regions having a continuous lipidic phase, and other regions having a continuous hydrophilic one). It can also include more complex emulsions like multiple emulsions.

The aqueous hydrophilic phase usually comprises water and/or liquid anhydrous polyols (glycerol, propylene glycol), dissolved powders (such as solid polyols like sorbitol, sugars, milk, or the like), and sometimes suspended hydrophilic solid particles (crystalline sugars, non-gelatinised starch or the like). The nature of the continuous phase is driven by the formulation (especially the volume ratio of lipidic to hydrophilic phases and the nature and quantity of emulsifiers) but also by the process (especially the incorporation sequence of ingredients, shear and temperature). Preferred emulsion fillings according to the method and compositions disclosed herein are those wherein lipids form mainly a continuous phase through at least part of the filling, more preferably throughout the whole filling. They can be used for instance in chocolate shells. On the other hand, the use of a continuous hydrophilic phase can be used to further limit oil migration to the chocolate component.

A filled chocolate product may contain two or more fillings, including, for example, an emulsion and an anhydrous filling. One or more, preferably all, of these fillings may be provided as described herein. The fillings are preferably provided as distinct filling portions.

Where the filling is an anhydrous filling, the filling preferably has a total fat content of from 20 to 50 wt % by weight of the filling, more preferably from 24 to 42%, still more preferably from 25 to 35 wt % and most preferably from 26 to 29 wt %.

Where the filling is an emulsion-based filling, the filling preferably has a total fat content of from 10 to 35 wt % by weight of the filling, more preferably from 14 to 28 wt % and most preferably from 15 to 25 wt %.

Preferably the composite comestible product is a single serving size and is preferably, but not always, provided in an individually wrapped form. Alternatively the single serving size may comprise several of the composite comestible product, such as 2 to 6, and these may be wrapped together.

Preferably, the second component is present in an amount of from 5 to 94 wt % of the total weight of first and second components, more preferably from 10 to 90 wt %, still more preferably from 10 to 85 wt %, still more preferably from 10 to 75 wt % and most preferably from 11 to 52 wt %. Where the first component is a continuous bakery portion, the second component is present preferably in the above ranges, but still more preferably from 17 to 51 wt %, still more preferably at 17 to 40 wt % and most preferably at 25 to 38 wt % by weight of the total weight of first and second components. Preferably, the first and second components are present in a total amount of at least 40 wt % by weight of the composite comestible product, more preferably at least 50 wt %, still more preferably at least 65 wt %, still more preferably at least 80 wt %, and most preferably at least 95 wt %.

Comestible fats (or oils) are usually mainly made by triglycerides, composed of three fatty acids esterified on a glycerol backbone. Interesterification means that some (and usually a very significant proportion) of the fatty acids from the initial fat (or oils) are rearranged on the glycerol position, i.e. can be switched from one position to another on the same glycerol backbone and/or can be switched between any position between different glycerol backbones.

The first component has a total fat content comprising a randomly interesterified fat. Such fats are well-known to those skilled in the art and are generally prepared by chemically interesterifying a fat or an oil. Enzymatically interesterified fat can also be used provided it brings random interesterification thanks to the enzyme and/or process conditions. Random interesterification means that at least 50% of the fatty acid moieties of the fat or oil are randomly distributed on the glycerol after the interesterification. Preferably, at least 65% of the fatty acid moieties of the fat or oil are randomly distributed after the interesterification, more preferably at least 80% and even more preferably at least 90%. It will be appreciated that the extent of random distribution of fatty acids is determined before the randomly interesterified fat is blended with fats or oils that are not randomly interesterified, like the liquid oil, where present. Preferably, the randomly interesterified fat is not significantly fractionated after the interesterification. More preferably, the randomly interesterified fat is not fractionated after the interesterification.

The randomly interesterified fat has a saturated fat content of from 35 to 55 wt % by weight of the randomly interesterified fat, more preferably from 40 to 50 wt %, and most preferably from 42 to 48 wt %. The present inventors have surprisingly found that randomly interesterified fats are effective in reducing bloom formation in an adjacent chocolate component even at low levels of saturated fat and even when no lauric fat or long chain fatty acids are present. This is surprising because fats that are low in saturated fat are known to be more mobile and would be expected to be susceptible to migrate into the chocolate component. It has also been found that the fats described herein lead to softening of the chocolate component equal or reduced relative to fats of the prior art, despite the low saturated fat content.

Preferably, the randomly interesterified fat is a non-lauric fat. Thus the randomly interesterified fat of the present disclosure is distinguished over known antibloom fats, which typically have high levels of fatty acids (mostly saturated fatty acids) of short chain length having 12 carbons (lauric: $C_{12}$) or less. Preferably, the randomly interesterified fat comprises less than 5 wt % fatty acids having 12 carbon atoms or fewer by weight of the randomly interesterified fat, more preferably less than 4 wt %, still more preferably less than 2 wt % and most preferably less than 1 wt %. Preferably, the randomly interesterified fat comprises at least 0.1 wt % fatty acids having 12 carbon atoms or fewer by weight of the randomly interesterified fat. As used herein, the term "fatty acids" encompasses all fatty acid moieties, that is, free fatty acids as well as fatty acid moieties chemically bonded to a glyceryl backbone.

Analysis of the fatty acid profile of a fat is a routine measurement giving the proportion of each fatty acid in wt % (vs 100 wt % of fatty acids). It is available at Iterg, France (PREPARATION ET ANALYSE PAR CPG DES ESTERS METHYLIQUES D'ACIDES GRAS (NF EN ISO 12966-2 ET 12966-4)—Composition avec utilisation de facteurs de correction). By summing the relevant fatty acids, it enables the content of saturated fatty acids (herein referred to as saturated fat) and trans fatty acids to be determined.

Preferably, the randomly interesterified fat comprises less than 5 wt % saturated fatty acids having 20 or more carbon atoms by weight of the randomly interesterified fat, more preferably less than 3 wt % and most preferably less than 1 wt %. Preferably, the randomly interesterified fat comprises at least 0.1 wt % saturated fatty acids having 20 or more carbon atoms by weight of the randomly interesterified fat. These saturated long chains enable a much harder fat, thus less oil migration. But they are expensive and not widely available without hydrogenation. Accordingly, the antibloom fats of the invention distinguished from the prior art by having less saturated fat, no significant amount of short chain fatty acids (12 carbons or less) and no significant amount of long saturated fatty acids (20 or more carbon atoms) and no significant amount of trans fatty acids.

Preferably, the randomly interesterified fat comprises at least 50 wt % saturated fatty acids having 16 carbon atoms by weight of its saturated fat content, more preferably at least 75 wt % and most preferably at least 80 wt %.

Preferably, the randomly interesterified fat comprises at most 95 wt % saturated fatty acids having 16 carbon atoms by weight of its saturated fat content.

Preferably, the randomly interesterified fat has a solid fat content of from 1 to 8 wt % at 40° C., more preferably from 2 to 6 wt % and most more preferably from 3 to 5 wt %. Solid fat content (SFC) measurements are well known in the art and are used to describe how much solid the fat has at the particular measurement temperature in order to estimate its melting profile for instance, or its ability to migrate. Methods of measuring SFC are well known in the art, with diagnostic machines available to measure the SFC of any fat composition. For non-temper fats (including the randomly interesterified fat discussed herein) SFC are measured according to the ISO-8292-1D (non-stabilising, direct/parallel) measurement standard.

Preferably, the randomly interesterified fat is a randomly interesterified palm oil or a randomly interesterified palm oil fraction, more preferably a randomly interesterified palm olein.

Preferably, the total fat content comprises the randomly interesterified fat in an amount of at least 30 wt % by weight of the total fat content, more preferably at least 40 wt %. Preferably, the total fat content comprises the randomly interesterified fat in an amount of at most 90 wt %, preferably at most 80 wt %, by weight of the total fat content.

Preferably, the total fat content further comprises a liquid oil in an amount of from 10 to 70 wt % by weight of the total fat content. The term "liquid oil" refers to a fat that is predominantly liquid at room temperature. The liquid oil as defined herein has a saturated fat content of less than 20 wt % by weight of the liquid oil and a solid fat content of less than 5 wt % at 20° C. In this embodiment, the randomly interesterified fat is preferably present in a total amount of from 90 to 30 wt % by weight of the total fat content. More preferably, the total fat content comprises from 10 to 50 wt % liquid oil and from 90 to 50 wt % randomly interesterified fat by weight of the total fat content, still more preferably from 30 to 50 wt % liquid oil and from 70 to 50 wt % randomly interesterified fat. Surprisingly and unexpectedly, the randomly interesterified fat of the present disclosure is effective at inhibiting bloom in an adjacent chocolate component even when used in combination with a liquid oil, which would normally be expected to increase fat mobility and accelerate bloom. The use of liquid oils is desirable from a health perspective since they are low in saturated fat.

For the avoidance of doubt, the term "total fat content" refers to added fat(s) in the first component. It does not include fat present in minor amounts in other ingredients present in the first component such as cereals, flour, cocoa powder and nuts.

Preferably, the randomly interesterified fat and the liquid oil are present in a total amount of at least 80 wt %, more preferably at least 90 wt %, still more preferably at least 92 wt % and most preferably at least 95 wt % by weight of the total fat content. Preferably, the randomly interesterified fat and the liquid oil are present in a total amount of at most 99 wt % by weight of the total fat content. The total fat content most preferably consists or consists essentially of the liquid oil and the randomly interesterified fat.

In some embodiments, the total fat content comprises from 100 to 30 wt % randomly interesterified fat and from 0 to 70 wt % liquid oil, wherein the randomly interesterified fat and the liquid oil are present in a total amount of at least 80 wt %, more preferably at least 90 wt %, still more preferably at least 92 wt % and most preferably at least 95 wt % by weight of the total fat content. More preferably, the total fat content comprises from 90 to 30 wt % randomly interesterified fat and from 10 to 70 wt % liquid oil, wherein the randomly interesterified fat and the liquid oil are present in a total amount of at least 80 wt %, more preferably at least 90 wt %, still more preferably at least 92 wt % and most preferably at least 95 wt % by weight of the total fat content.

Preferably, the liquid oil is selected from the group consisting of canola oil, rapeseed oil, sunflower oil, soy oil, peanut oil, corn oil, cottonseed oil, olive oil, oils extracted from grape seeds, hazelnut or other nut oils, linseed, rice bran oil, safflower, sesame, liquid fractions of palm oil, liquid fractions of shea butter, liquid algae oil, diglyceride liquid oil and mixtures of two or more thereof. More preferably, the liquid oil is selected from the group consisting of canola oil, rapeseed oil, sunflower oil, soy oil, peanut oil, corn oil, cottonseed oil, olive oil, oils extracted from grape seeds, hazelnut or other nut oils, rice bran oil, liquid algae oil, and mixtures of two or more thereof. It will be appreciated that the oil may be obtained from a wild-type source (i.e. the main typical form of the source as it occurs in nature). Alternatively, the oil may be obtained from cultivars selected (by conventional or, less preferably, genetically modified methods) to have different features, like a different fatty acid composition (for example, high-oleic oils). Preferably, the liquid oil is non-interesterified and/or non-hydrogenated.

The total fat content comprises from 20 to 50 wt % saturated fat by weight of the total fat content, preferably from 24 to 50 wt %, more preferably from 25 to 46 wt %, still more preferably from 30 to 46 wt % and most preferably from 35 to 46 wt %. The present inventors have found that the randomly interesterified fat of the present disclosure is effective in inhibiting bloom even at low saturated fat levels.

The total fat content comprises less than 3 wt % trans fatty acids by weight of the total fat content, preferably less than 1 wt %, and preferably at least 0.1 wt %. The fat composition of the present disclosure has been found to be effective in inhibiting bloom even at low trans fatty acid levels. This is surprising since TFAs are known to have a high compatibility with CB.

Preferably, the total fat content comprises less than 5 wt % partially hydrogenated oil by weight of the total fat content, more preferably less than 1 wt %, and preferably at least 0.1 wt %. The total fat content most preferably comprises no or substantially no partially hydrogenated oil. Furthermore, the total fat content is most preferably non-hydrogenated. Thus, the fat composition of the present disclosure is distinguished over some known bloom-inhibiting fat compositions, including significant quantities of hydrogenated or partially hydrogenated oil.

Preferably, the total fat content comprises less than 5 wt % fatty acids having 12 carbon atoms or fewer by weight of the total fat content, preferably less than 4 wt %, still more preferably less than 2 wt % and most preferably less than 1 wt %. Preferably, the total fat content comprises at least 1 wt % fatty acids having 12 carbon atoms or fewer by weight of the total fat content.

Preferably, all or substantially all of the fat present in the total fat content is non-temper fat. Advantageously, the fat composition of the present disclosure crystallises rapidly without requiring a tempering step, making it suitable for use in bakery portions and fillings.

Preferably, the total fat content has a SUS-triglyceride content of less than 20 wt % by weight of the total fat content, more preferably less than 15 wt % and most preferably less than 10 wt %. Preferably, the total fat content has a SUS-triglyceride content of at least 1 wt % by weight of the total fat content. As used in relation to this feature, S means a saturated fatty acid having 14 to 20 carbons, U an unsaturated fatty acid having 14 to 20 carbons. SUS thus further means a symmetrical triglyceride, having the unsaturated fatty acid in the middle (position 2 on glycerol) and two saturated fatty acids (which may be different in chain length) in position 1 and 3. Methods of measuring the SUS-triglyceride content are well known to those skilled in the art. For example, the SUS-triglyceride content may be measured by liquid chromatography-mass spectrometry (LCMS). Suitable measurement methods are described in "Modern Methods for Lipid Analysis by liquid chromatography/mass spectrometry and related techniques", editor William Craig Byrdwell, 2005 (ISBN 1-893997-75-8); the analysis of TAG regioisomers is exhaustively treated and reviewed in Chapters 6 (Regiospecific analysis of triacylglycerols using HPLC-APCI-MS, by Hazel Mottram) and 7 (Qualitative and quantitative analysis of triacylglycerols by atmospheric pressure ionization (APCI and ESI) mass spectrometry techniques, by William Byrdwell).

Preferably, at least 80 wt % of the fat present in the total fat content is vegetable fat, more preferably at least 90 wt %, still more preferably at least 95 wt %, and most preferably at least 99 wt %. Preferably, at most 99.5 wt % of the fat present in the total fat content is vegetable fat.

In certain preferred embodiments, there is provided a composite comestible product comprising distinct first and second components,
    wherein the first component is a non-chocolate component forming a bakery portion and having a total fat content comprising from 9 to 23 wt % of the bakery portion, wherein the total fat content comprises:
    (i) a randomly interesterified fat, the randomly interesterified fat having a saturated fat content of from 40 to 50 wt % by and comprising less than 4 wt % fatty acids having 12 carbon atoms of fewer and less than 3 wt % saturated fatty acids having 20 or more carbon atoms by weight of the randomly interesterified fat, and, optionally,
    (ii) a liquid oil, the liquid oil having a saturated fat content of less than 20 wt % by weight of the liquid oil and a solid fat content of less than 5 wt % at 20° C.,
    wherein the total fat content comprises from 25 to 46 wt % saturated fat,
    wherein when the total fat content comprises a liquid oil, the randomly interesterified fat and the liquid oil are present in a total amount of at least 92 wt % by weight of the total fat content,
    wherein the second component is a chocolate component comprising one or more sources of cocoa butter (CB) or cocoa butter equivalent (CBE), the second component having a total content of $SU_2$ and $U_3$ triglycerides of less than 8 wt % based on the total triglycerides present in the second component;
    wherein:
        (a) the first component forms a continuous bakery portion, the first and second components are in direct contact and form adjacent first and second layers respectively, or
        (b) the first component forms a continuous bakery portion and the second component forms one or more discrete inclusions in the first component, or
        (c) the second component forms a continuous chocolate portion and the first component forms one or more discrete inclusions in the second component.

In certain preferred embodiments, there is provided a composite comestible product comprising distinct first and second components,
    wherein the first component is a non-chocolate component forming a filling and having a total fat content comprising:
    (i) a randomly interesterified fat, the randomly interesterified fat having a saturated fat content of from 40 to 50 wt % by and comprising less than 4 wt % fatty acids having 12 carbon atoms of fewer and less than 3 wt % saturated fatty acids having 20 or more carbon atoms by weight of the randomly interesterified fat, and, optionally,
    (ii) a liquid oil, the liquid oil having a saturated fat content of less than 20 wt % by weight of the liquid oil and a solid fat content of less than 5 wt % at 20° C.,
    wherein the total fat content comprises from 25 to 46 wt % saturated fat, less than 15 wt % SUS-triglycerides and less than 1 wt % trans fatty acids by weight of the total fat content,
    wherein when the total fat content comprises a liquid oil, the randomly interesterified fat and the liquid oil are present in a total amount of at least 92 wt % by weight of the total fat content,
    wherein the second component is a chocolate component comprising one or more sources of cocoa butter (CB) or cocoa butter equivalent (CBE), the second component having a total content of $SU_2$ and $U_3$ triglycerides of less than 8 wt % based on the total triglycerides present in the second component; and
    wherein the first component and the second component are in direct contact and form adjacent first and second layers respectively,
    wherein the second layer forms a shell at least partially enrobing the filling.

According to a second aspect there is provided a fat composition for use in forming a chocolate-containing comestible product, the fat composition having a total saturated fat content of from 20 to 50 wt % and a total trans fatty acid content of less than 3 wt % and comprising:
    (i) from 30 to 90 wt % of a randomly interesterified fat having a saturated fat content of from 35 to 55 wt % by weight of the randomly interesterified fat; and
    (ii) from 70 to 10 wt % of a liquid oil having a saturated fat content of less than 20 wt % by weight of the liquid oil and a solid fat content of less than 5 wt % at 20° C.,
    wherein the randomly interesterified fat and the liquid oil are present in a total amount of at least 90 wt % by weight of the fat composition.

The term "chocolate" is defined herein elsewhere and includes "chocolate compound" components.

Preferably, the fat composition comprises from 10 to 50 wt % liquid oil and from 90 to 50 wt % randomly interesterified fat by weight of the fat composition, more preferably from 30 to 50 wt % liquid oil and from 70 to 50 wt % randomly interesterified fat. The randomly interesterified fat and the liquid oil are preferably present in a total amount of at least 92 wt %, more preferably at least 95 wt % by weight of the fat composition. Preferably, the randomly interesterified fat and the liquid oil are present in a total amount of at most 99 wt % by weight of the fat composition. The fat composition most preferably consists or consists essentially of the liquid oil and the randomly interesterified fat. The randomly interesterified fat and the liquid oil are the same as those defined in relation to the first aspect.

The fat composition comprises from 20 to 50 wt % saturated fat by weight of the fat composition, preferably from 24 to 50 wt %, more preferably from 25 to 46 wt %, still more preferably from 30 to 46 wt % and most preferably from 35 to 46 wt %.

The fat composition comprises less than 3 wt % trans fatty acids by weight of the fat composition, preferably less than 1 wt %, and preferably at least 0.1 wt %.

Preferably, the fat composition comprises less than 5 wt % partially hydrogenated oil by weight of the total fat content, more preferably less than 1 wt %, and preferably at least 0.1 wt %. The fat composition most preferably comprises no or substantially no partially hydrogenated oil. Furthermore, the fat composition is most preferably non-hydrogenated.

Preferably, the fat composition comprises less than 5 wt % fatty acids having 12 carbon atoms or fewer by weight of the fat composition, preferably less than 4 wt %, still more preferably less than 2 wt % and most preferably less than 1 wt %. Preferably, the fat composition comprises at least 1 wt % fatty acids having 12 carbon atoms or fewer by weight of the total fat content.

Preferably, all or substantially all of the fat present in the fat composition is non-temper fat.

Preferably, the fat composition has a SUS-triglyceride content of less than 20 wt % by weight of the fat composition, more preferably less than 15 wt % and most preferably less than 10 wt %. Preferably, the fat composition has a SUS-triglyceride content of at least 1 wt % by weight of the fat composition. As used in relation to this feature, S means a saturated fatty acid having 14 to 20 carbons, U an unsaturated fatty acid having 14 to 20 carbons. SUS thus further means a symmetrical triglyceride, having the unsaturated fatty acid in the middle (position 2 on glycerol) and two saturated fatty acids (which may be different in chain length) in position 1 and 3.

Preferably, at least 95 wt % of the fat present in the fat composition is vegetable fat, more preferably at least 99 wt %. Preferably, at most 99.5 wt % of the fat present in the fat composition is vegetable fat. It will be appreciated that the preferred characteristics of the "total fat content" of the first aspect may equally apply to the "fat composition" of the second aspect and vice versa. In particular, any advantages described in relation to the first aspect are equally applicable to the second aspect.

Minor amounts of additional ingredients may be added to the fat composition such as sugars, flavourings and emulsifiers (such as lecithin, lyso-lecithin, ammonium phosphatide, PGPR, mono and di-glycerides of fatty acids, E472a to E472e, sorbitan mono or tristearate) to form a mixture of the fat composition and the additional ingredient(s). Such additional ingredients do not form part of the "fat composition" as defined herein.

According to a further aspect there is provided a sealed and airtight package comprising the composite comestible product or the fat composition as described herein.

According to a further aspect there is provided a method for producing a comestible product, the method comprising:
(i) providing a dough; and
(ii) baking the dough to form a baked dough,
wherein the baked dough has a total fat content comprising a randomly interesterified fat, the randomly interesterified fat having a saturated fat content of from 35 to 55 wt % by weight of the randomly interesterified fat,
wherein the total fat content comprises from 20 to 50 wt % saturated fat and less than 3 wt % trans fatty acids by weight of the total fat content;

wherein:
(a) the dough is provided with one or more discrete inclusions, the one or more discrete inclusions being chocolate components comprising one or more sources of cocoa butter (CB) or cocoa butter equivalent (CBE), and/or
(b) the baked dough is cooled to between 18 and 40° C. and is then at least partially coated with a chocolate component to form a comestible product, the chocolate component comprising one or more sources of cocoa butter (CB) or cocoa butter equivalent (CBE).

It will be appreciated that the preferred characteristics of the continuous bakery portion and chocolate component of the first aspect apply equally to the baked dough and chocolate component of the present aspect respectively.

Where the baked dough is at least partially coated with a chocolate component to form a comestible product (option (b)), the baked dough is, prior to being coated with the chocolate component, preferably cooled to 20 to 32° C., more preferably 22 and 31° C. Preferably, the baked dough is cooled at 24° C. to 29° C. Preferably the chocolate component used in step (b) is a liquid chocolate component.

Where the dough is provided with one or more discrete inclusions (option (a)), the one or more discrete inclusions may be added during or after the formation of the dough; for instance the discrete inclusions can be added after the division of the dough, on top of the individual unbaked pieces. In another example, the inclusions may be added into a mixer and then the remaining ingredients and water may be added to together form and prepare a dough.

Moreover, as will be appreciated for mass production of such products, the steps may be part of a continuous process. For example, mixed batches of dough may be fed to a hopper for shaping and baking. In a continuous process the dough may be conducted through the process on a conveyor system.

Preferably, the discrete inclusions are added at the end of the dough formation, especially to reduce breakage and oil migration. Preparing the dough comprises the mixing of a conventional dough containing water, cereal products such as refined or wholegrain flours, sugars, a source of fat(s) and oil(s) according to this invention and optionally eggs, cocoa powder or liquor or cocoa butter and baking powder. Examples of suitable recipes are well known in the art and vary depending on the specific target product.

Preferably the step of preparing the dough further includes shaping the dough into individual portions. This may be by wire cutting and or by rotary moulding, for example. The step of splitting or forming the dough in discrete pieces preferably takes place before the step of baking the dough for products such as biscuits and soft cakes. The step of splitting or forming the dough in discrete pieces can also takes place after the step of baking the dough for products such as brownies and layer cakes. Some products, like Brownies, can be done both way, depending on whether the product is to be baked in a mould or on the oven band or plates.

The baking step may be at temperatures of up to 200° C. or even higher and for durations of from 1 to 20 minutes or more, time depending on size and baking temperature, as well as initial and final water content. Such baking conditions may be sufficiently harsh to favour fat migration and bloom formation.

Preferably the baked comestible products are allowed to passively cool after baking. That is, preferably the baked comestible products are not actively cooled. Alternatively, however, the baked comestible products may be actively cooled, for example by being submitted to forced air. According to a further aspect there is provided a method for producing a comestible product, the method comprising:
(i) providing a filling at a temperature of between 18 and 40° C.; and
(ii) at least partially coating the filling with a chocolate component comprising one or more sources of cocoa butter (CB) or cocoa butter equivalent (CBE) to form a comestible product,
wherein the filling has a total fat content comprising a randomly interesterified fat, the randomly interesterified fat having a saturated fat content of from 35 to 55 wt % by weight of the randomly interesterified fat, and
wherein the total fat content comprises from 20 to 50 wt % saturated fat and less than 3 wt % trans fatty acids by weight of the total fat content.

Preferably, the method is a method of producing a composite product as defined in relation to the first aspect.

It will be appreciated that the preferred characteristics of the filling and chocolate component of the first aspect apply equally to the filling and chocolate component of the present aspect respectively.

Preferably the chocolate component used in step (ii) is a liquid chocolate component.

According to a further aspect there is provided a method for producing a comestible product, the method comprising:
(i) providing a filling; and
(ii) depositing the filling at a temperature of between 18 and 40° C. onto a chocolate layer or into a chocolate shell, the chocolate layer or chocolate shell comprising one or more sources of cocoa butter (CB) or cocoa butter equivalent (CBE), to form a comestible product,
wherein the filling has a total fat content comprising a randomly interesterified fat, the randomly interesterified fat having a saturated fat content of from 35 to 55 wt % by weight of the randomly interesterified fat, and
wherein the total fat content comprises from 20 to 50 wt % saturated fat and less than 3 wt % trans fatty acids by weight of the total fat content. The chocolate layer or shell is preferably solidified, at least partially, before the filling is deposited thereon or therein.

Preferably, in step (ii), the filling is deposited at a temperature of between 20 and 34° C., more preferably between 24 and 33° C., and most preferably between 26 and 32° C. Preferably, the filling is deposited in liquid form.

It will be further appreciated that the preferred characteristics of the chocolate component and filling of the first aspect apply equally to the chocolate layer or shell and filling of the present aspect.

Preferably, each of the methods is a method of producing a composite product as defined in relation to the first aspect.

Preferably, each of the methods further comprises packaging the product, optionally singularly.

Preferably, packaging takes place with a product temperature below 35° C., preferably between from 0 to 35° C., more preferably 16 to 35° C., preferably 17 to 30° C., preferably 18 to 25° C. and 20 to 25° C. This may require air conditioning. For cheaper manufacturing processes, air conditioning at the packaging stage may be avoided, and preferably the product is packed when its surface reach 24 to 30° C., preferably 25 to 27° C.

Preferably, each of the methods provides a comestible product which is shelf stable for at least 2 weeks, preferably at least 4 weeks, preferably at least 2 months, preferably at least 3 months, more preferably 6, even more preferably 9 months when stored at 20° C. That is, the product remains fresh and without bloom on the surface of the chocolate component for at least this period when stored at 20° C. As will be appreciated, high storage temperatures can cause excessive risk of bloom. However, the product described herein can be kept at ambient temperatures, i.e. without refrigeration, like typically between 15 to 26° C., without developing bloom on a surface of the chocolate component.

According to a further aspect there is provided a composite comestible product obtainable by the methods described herein.

According to a further aspect there is provided the use of a randomly interesterified fat in a first component which forms a continuous bakery portion or a filling, to prevent fat bloom on a surface of a second component which is a chocolate component comprising one or more sources of cocoa butter (CB) or cocoa butter equivalent (CBE), the first and second components being in direct contact,
wherein the randomly interesterified fat has a saturated fat content of from 35 to 55 wt % by weight of the randomly interesterified fat.

The preferred characteristics of the randomly esterified fat, the continuous bakery portion and the filling of the first aspect apply equally to the respective components of the present aspect.

By "prevent fat bloom" or by "without developing bloom", it is meant that no fat bloom is discernible (with the naked eye in good natural light conditions) on a surface of the chocolate component for at least 4 weeks of storage at 18 and 25° C. (parallel tests at both isothermal temperatures+/− 0.5° C.), more preferably no fat bloom is discernible for at least 8 weeks at both temperatures and even more preferably for at least 12 weeks at both temperatures. Preferably, no fat bloom is also discernible for 6 months, preferably after 9 months, at 18° C. (with the naked eye in good natural light conditions).

Preferably, the use is to prevent fat bloom on the surface of the second component during storage in a sealed and airtight package at a temperature of from 18 to 25° C., preferably for at least 3 months, more preferably at least 6 months, still more preferably at least 9 months.

The comestible products, inclusions, coatings, fillings or the like discussed herein may be described as being or containing chocolate, even when they include any level of cocoa butter equivalent (CBE) even though such products may not be sold as chocolate in some jurisdictions. So the chocolate compounds made with CBE (and for instance no added cocoa butter) are included in the definition of the chocolate component.

In the present disclosure, the term coated/coating with a chocolate component means a layer of chocolate which can be obtained by different methods:
using a classical chocolate enrober, to partially or totally coat i.e. a biscuit with liquid chocolate
by moulding, i.e. putting a biscuit in a mould and pour liquid chocolate on top,
by producing separately a chocolate component (i.e. a chocolate tablet) and a bakery component, which are then stuck together using some drops of liquid chocolate, liquid chocolate compound or liquid filling or liquid fat, those drops acting as glue upon cooling.

Combinations of one or more of these methods can be used to produce the coating.

FIGURES

The present disclosure will be described in relation to the following non-limiting figures, in which:

FIG. 1 shows a composite comestible product in accordance with the present disclosure having two layers. The darker layer depicts a chocolate layer, and the lighter layer depicts a filling in direct contact with the chocolate layer.

EXAMPLES

The present disclosure will be described in relation to the following non-limiting examples. The chocolate components used in the Examples have a $SU_2+U_3$ triglyceride content of less than 10 wt % as defined hereinbefore.

Example 1

An anhydrous filling was prepared in accordance with the present disclosure and its compatibility with chocolate was studied with the following method.
Principle of the Method
To compare/study the chocolate bloom due to fat migration from the filling, the following method was used:
  Make a lab-model test product: the non-aerated fat filling was poured as a layer, crystallised, then covered with dark chocolate containing 2% of Anhydrous Milk Fat (AMF). This two-layered product was dosed in a Rodac petri plate:
    9 g of fat filling (about 3 mm thick)
    3 g of chocolate (exactly 0.9 mm).
  The two-layered product is depicted in FIG. 1.
  Keeping tests: The petri plates containing the lab-model test product were stored isothermally at 25° C. and 18° C. (two conditions in parallel). Once a week, the samples were monitored to check whether bloom had occurred on the surface of the chocolate. The test was stopped when the bloom was visible to the naked eye (with optimal natural light conditions). The result is expressed as a number of weeks before bloom is seen (at either 25° C. or 18° C.), which is expressed quantitatively with a Fat Bloom Index for this Model test product (FBIM).
  Usually, fat bloom is accelerated at 25° C., so it appears first at this temperature. For instance, a "FBIM=12" means blooms appears (usually at 25° C.) after 12 weeks.
Filling
(a) Recipes
  Recipes of fillings with a chocolate flavour were made with the recipe shown in Table 1 (everything was kept constant except the nature of the added fat to study).

TABLE 1

| filling composition | |
| --- | --- |
| Ingredient | Amount (wt %) |
| Icing sugar | 58.23 |
| Cocoa powder (11% fat) | 13 |
| Added fat blend | 28.57 (details in table 2) |
| Soy lecithin | 0.2 |
| TOTAL | 100% (30.2% total fat) |

Table 2 (see overleaf) presents fat blend comparative recipes (C1-C8) as well as recipes according to the present disclosure (D-F).

| | | Comparative samples | | | | | | | | Examples according to the invention | | |
| --- | --- | --- | --- | --- | --- | --- | --- | --- | --- | --- | --- | --- |
| | Recipe code | C1 | C2 | C3 | C4 | C5 | C6 | C7 | C8 | D | E | F |
| Detail of ADDED fat in filling | oil 1 nature | Rapeseed | hoso | palm olein | RDB palm oil | Anhydrous Milk Fat (cow) | Fuji Bisco DA01 | Fuji Ertifil AB550 | no filling (chocolate alone) | IE palm olein | IE palm olein | IE palm olein |
| | oil 1% | 100 | 100 | 100 | 100 | 100 | 100 | 100 | NA | 100 | 87.5 | 87.5 |
| | oil 2 nature | | | | | | | | | | Rapeseed oil | hoso |
| | oil 2% | 0 | 0 | 0 | 0 | 0 | 0 | 0 | | 0 | 12.5 | 12.5 |
| | Sat fat in the above added fat blend (in % of fatty acids methyl esters) | 7 | 8 | 46 | 50 | 62 | 55.5 | 72 | | 46 | 41 | 41 |
| | % fatty acids with 12 or less carbons in the added fat blend | 0 | 0 | 0.3 | 0.3 | 13.5 | 4.5 | 26 | | 0.3 | 0.3 | 0.3 |
| | % trans fatty acids | <1 | <1 | <1 | <1 | 3.2 | <1 | <1 | | <1 | <1 | <1 |
| | Sat fat change vs DA01 (%) | −87% | −86% | −17% | −10% | 12% | 0% | 30% | | −17% | −26% | −26% |
| Bloom Resistance in dark chocolate | Number of weeks before fat bloom at 18° C. | NA (stopped after quick failure at 25° C.) | | | >38 (then stopped) | >67 | >38 (then stopped) | >67 | >46 but <67 | >67 | >67 | >67 |
| | FBIM = Number of weeks before fat bloom at 25° C. | 2 | 2 | 2 | 4 | >67 | 35 | >67 | 7 | >67 | >67 | >67 |
| | Number of weeks before fat bloom at | NA | NA | NA | NA | NA | NA | NA | >41 but <67 | >67 | >67 | >67 |

-continued

| | Recipe code | Comparative samples ||||||||  Examples according to the invention |||
|---|---|---|---|---|---|---|---|---|---|---|---|---|
| | | C1 | C2 | C3 | C4 | C5 | C6 | C7 | C8 | D | E | F |
| | Office room temperature (17 to 27° C.) Chocolate hardness (g at 0.8 mm) after 10 months of storage at 25° C. in contact with filling. | NA | NA | NA | 306 | 32 (Chocolate too soft) | 173 | 135 | NA | 138 | 103 | NA |
| Bloom Resistance in milk chocolate | Number of weeks before fat bloom at 18° C. | | | | | | | | >67 | >67 | >67 | >67 |
| | FBIM = Number of weeks before fat bloom at 25° C. | | | | | | | | >67 | >67 | >67 | >67 |
| | Office room temperature (17 to 27° C.) | | | | | | | | >67 | >67 | >67 | >67 |

Details of the fats used in Table 2 are as follows:
Comparative Fats: C1 to C7
  Liquid oil used (not fractionated): regular and native rapeseed or high oleic sunflower (hoso). Each of these liquid oils has a SFC at 20° C. of 0. Rapeseed has 30% PUFA and high oleic sunflower has 9% PUFA.
  C3 is a standard palm olein, obtained by mechanical fractionation of palm oil.
  C4–RDB palm oil=Native Palm oil refined, deodorized and bleached (RDB)
  C5 to C7 are commercially available Anti-Bloom Fats (ABF) known to those skilled in the art: AMF and two ABF from Fuji Oil Europe.

Dark chocolate is much more sensitive to bloom than milk chocolate, and usually requires an anti-bloom fat in the biscuit or filling at its contact. So to avoid chocolate bloom coming from the migration of the fat from the fat filling (or a biscuit) to the dark chocolate, people usually use (in the filling/biscuit) either:
  anhydrous milk fat
  specialty fats known as antibloom fat (ABF).

Two commercial ABF from Fuji are used here are comparative examples; they contains significant levels of lauric fats (4.5% and 26% as seen by the % fatty acids with 12 or less carbons) and have high to very high saturated fat levels (55.5% and 72%).

Further Details on IE Palm Olein:
A commercially available palm olein chemically interesterified and refined was used having the following fat profile:
  non-hydrogenated
  FFA<0.1%
  TFA=0.4%
  SFC (IUPAC method already mentioned)
    28% at 20° C.
    12% at 30° C.
    7% at 35° C.
    3 to 4% at 40° C.

This chemical interesterification enables the fatty acids to be randomly distributed on the glycerol.

All the fats used in Table 2 are non-hydrogenated and non-tempered fats.

(b) Preparation of the Melted Filling

A filling was prepared using a Kenwood Major mixer with a K blade (3.5 kg of filling per batch).

All powders were premixed together and put aside.

Weight and melt the fats at 70° C.; add oils and lecithin and blend in the Kenwood bowl until the fat phase was thoroughly premixed. The fat blend was at about 60° C. at this stage. The powder premix was added into the bowl and the filling was mixed using the Kenwood mixer for 5 minutes (at the maximum possible speed without splashing out), while maintaining the temperature at 60° C. using a heat air gun if necessary.

Chocolate Recipes

Dark Chocolate recipe: 44.5% sugar, 42% cocoa mass, 7.5% cocoa butter, 3% lactose, 2% anhydrous milk fat, 0.5% soy lecithin, 0.5% PGPR. Total fat 33.2%.

The test was also carried out, for some of the fillings, with a milk chocolate.

The milk chocolate was made by blending at 45° C. a commercially available milk chocolate tablet with 1% cocoa butter and 0.5% PGPR (to improve the spreading of this very thin chocolate layer). The commercially available milk chocolate tablet used contains sugar, cocoa butter, skimmed milk powder (11-14%), cocoa mass 10%, whey powder (5-8%), 4.8% anhydrous milk fat, hazelnut paste (<1%) and soy lecithin. It has 29.5% total fat.

Preparation of Two-Layered Test Products
Filling:
  Place Petri plates at 18-20° C.
  Dose 9 g of filling at about 60° C. in each petri plates (Rodac plates: standardized petri plates commonly used in microbiology, 4.6 mm deep, diameter 57 mm);
    Petri plates then receive (immediately after depositing) adequate shaking to flatten the filling surface Cool immediately in a Sollich chocolate tunnel (10 minutes at 10° C., max air convection speed).

Take care to ensure the filling surface is as flat and horizontal as possible, in order to ensure then a thickness of chocolate as even as possible. Store and stabilize 3 days at 19-20° C.

Chocolate:

Using an Aasted AMK10 tempermeter at 10 kg/H, temper the chocolate to a temperindex of 4.5 to 5.8 (as indicated by a tempermeter Sollich E2), corresponding to a final temperature around 26.5° C. (milk) to around 28.5° C. (dark chocolate).

Equilibrate the petri plates containing the filling (prepared above) in monolayer (no stacking, no cover) for 1 H minimum at 26 to 27° C. (for Milk chocolate) or at 28 to 30° C. (for dark).

Then dose 3 g of chocolate on the filling. To get a uniform flat chocolate layer of 0.9 mm even thickness, three specific techniques are used: depositing with a small syringe in spiral covers initially most of the surface, then a microbiology plastic spreader is used immediately to improve the spread, followed by adequate shaking. Both said syringe and microbiology spreader are clean and initially stored at the same temperature as the chocolate exit temperature. It is very important to ensure a chocolate thickness of 0.9 mm as even as possible on its 2 surfaces.

Also dose 3 g of chocolate directly on other petri plates (placed previously at 29° C.) without filling below: this is a chocolate control (without filling: C8).

The chocolate is then rapidly crystallised in a Sollich cooling tunnel with air convection at 12° C. and low air speed (50%) during 10 minutes (common best practice for a thin chocolate layer).

Then stabilize all products (bilayers: filling+chocolate; and chocolate control) for 3 days at 18±1° C.

Keeping Tests to Study Bloom Stability

Place 6 petri plates of each filling/chocolate combination at each of these conditions:
25±0.5° C.
18±0.5° C.
Optionally (not done for all trials): office at room temperature (which varied during the period between the extreme 17 to 27° C.).

Inspection for fat bloom on the chocolate was done visually (by naked eye) every 7 days during 12 weeks, then every about 4 weeks until 41 weeks. A final check was done at 67 weeks.

Chocolate products are usually stored by the consumer at room temperature, i.e. in a lot of climates 20±2° C. for most of the time. At 25° C., bloom is expected to appear quicker.

At 25° C., it is desirable that bloom should not appear until after more than 8 weeks for medium antibloom fats and more than 12 weeks for good anti-bloom fats. Bloom at 18° C. should appear only after shelf life, i.e. at least 9 months minimum for most bakery and chocolate products.

Results and Conclusions

The results are presented in Table 2 and are discussed below.

a/Results on Bloom for Dark Chocolate:

At 25° C.,

Rapeseed, hoso & palm olein blooms after only 2 weeks, palm blooms after 4 weeks: all this is clearly unacceptable for industrial products having shelf life from 6 to 18 months.

Bisco DA01 blooms after 35 weeks, which is excellent.

And all others filling fats induced no bloom on chocolate after more than 67 weeks when we stopped the test. However, chocolate on AMF filling is shiny and without discoloration, but has some small droplets of oil on the chocolate surface and the chocolate is very soft. So it does not bloom, but the chocolate is damaged.

The chocolate control C8 (no filling) was dosed with the same tempering/cooling conditions in the Petri plates. It did bloom between 46 and 67 weeks at 18° C., but blooms after only 7 weeks at 25° C. This demonstrates the dramatic impact of elevated storage temperature on chocolate fat bloom.

It should be noted that the chocolate at the contact of the antibloom fats (compositions C5 to C7 and D to F) is more resistant to fat bloom that the chocolate alone, although this is not fully understood.

Surprisingly, IE palm olein (pure of mixed with 13% rapeseed/hoso) is the most efficient Antibloom fat with outstanding results at 25° C. Despite less sat fat (46%) than the classical anti-bloom fats (72% and 55.5%), it is as efficient as Ertifill AB550 and more efficient than DA01, without any expensive lauric fat (compared to 26% and 4.5% of fatty acids with 12 or less carbon in respectively Ertifill AB550 and DA01).

Compositions D to F are outstanding antibloom fats at 25° C., but also at 18° C. and in variable room temperature in the office. Table 2 reports the dark chocolate at their contact was not bloomed after 67 weeks at 25° C., but in fact, they were even still not bloomed when checked a last time after 166 weeks at 25° C. (i.e. more than 3 years).

Control C6 has several disadvantages compared to the fats D to F according to the present disclosure:
More Saturated fat: +21 to +35%
More expensive (use of lauric fats like coconut or palm kernel oil)
Less bloom stability in extreme conditions (>35 weeks at 25° C.).

Control C7 has several disadvantages compared to the fats D to F according to the invention:
Much more Saturated fat: +56 to +75%
Much more expensive (use of lauric fats like coconut or palm kernel oil)
for the same bloom stability in extreme conditions (>67 weeks at 25° C.).

Note that the 3 ABF C5 to C7 all have from 4.5 to 26% of fatty acids with 12 or less carbons in the added fat blend, whereas the fat compositions according to the invention have only 0.3% (by weight of the FA). AMF also have more than 3% of TFA.

b/Results on Bloom for Milk Chocolate:

The impact of the fats in fillings on bloom of milk chocolate was also tested, but only for the fats D to F according to the present disclosure. They enable excellent bloom resistance on the milk chocolate (still no bloom seen after 67 weeks in the 3 temperature conditions tested) with lower sat fat than palm oil or classical antibloom fats.

Palm oil alone is often compatible with milk chocolate, but it has 9 to 22% more sat fat than the compositions D to F.

c/Results on Chocolate Hardness:

After 10 months of storage at 25° C. of the petri plates having the bilayer filling+dark chocolate, chocolate hardness is recorded at 25° C. with a TAXT2-plus texture analyser with the following procedure:
set the thermostatic chamber of the TAXT2-plus at 25° C., close its door and allow for stabilisation for at least 2 hours.

Move very quickly the Rodac plates (containing the bi-layer filling+chocolate) from the storage chamber to the TAXT2-plus chamber (as the texture may irremediably evolve with temperature change). It is critical to take all precautions to minimize filling's temperature changes (isolate from hands . . . ).

Put a Rodac plate on a suitable support (which always stays in the thermostatic chamber) to avoid the bottom of the plate to move (vertically or horizontally)

a right cylinder probe of 2 mm diameter is moved down at a speed of 1 mm/s and the resulting force is recorded over time hardness is taken as the force after the probe penetrates the chocolate by 0.8 mm the final result, expressed in grams at 0.8 mm, is the mean of 9 measures (3 per plate×3 plates).

The results are shown in Table 2 and discussed below.

The hardness of the dark chocolate after contact with a filling containing the fat composition according to the invention recipe D is:

the same as for the chocolate in contact with the filling containing C7, although the added fat in C7 has 56% more saturated fat.

Much higher than for the chocolate in contact with the filling containing AMF C5 (138 g vs 32 g), although the added fat in C5 is has 35% more saturated fat.

This demonstrates the benefit on hardness of having less % fatty acids with 12 or less carbons in the added fat blend.

The hardness of the chocolate after contact with a filling containing the fat composition according to the invention recipe E is a bit softer than for recipe D, due to the lower saturated fat. However, this is still acceptable, and much better than with AMF (C5).

Chocolate in contact with palm oil filling (C4) is much harder, but it is believed that this is an artefact because this chocolate is severely bloomed after 10 months at 25° C. (bloom reorganizes the cocoa butter network and usually creates crystals of form VI, having an increased melting point, thus higher SFC at 25° C.).

d/Results on Filling Hardness

Compositions D to F are very suitable to make fillings (especially for biscuits) because they crystallise quickly, have a suitable texture, with a good balance between melting and heat resistance. Accordingly, the sensorial properties of the fillings produced with compositions D to F are suitable to make fillings for chocolate pralines or to fill bakery products. Some Rodac plates were filled to the top with the hot (60° C.) filling (no chocolate) and scrapped (to standardize height), then crystallised immediately in the cooling tunnel as explained above.

The Rodac plates were then stored 14 days at 20° C. (1 set) and 14 days at 25° C. (another set in parallel).

Hardness was then measured at the same temperature than previously stored (20 or 25° C. respectively) by penetrometry with a TAXT2-plus (equipped with a thermostatic chamber to avoid temperature change during measure), using a cylinder of 10 mm of diameter. Exact numbers are not provided here, since hardness varies slightly depending on filling pre-crystallisation, filling cooling conditions and the storage and measurement temperatures (20 or 25° C.).

Nevertheless, general conclusions can be drawn. The hardness, between 20 and 25° C., of fillings with compositions D to F was found to be:

quite similar to fillings having compositions C4 and C6 about 3 times higher than fillings made with C5 (AMF) which is usually too soft softer than the very hard fillings made with C7.

e/Summary:

The fats compositions D to F have lower saturated fat than classical antibloom fats, and enable outstanding antibloom properties, without too much softening of the chocolate at contact. They also bring to fillings good technical properties: quick crystallization speed, suitable hardness at 20 to 25° C., and suitable heat resistance and melting profile.

Example 2

Crunchy cookies with big dark chocolate inclusions (thus highly visible) were prepared in accordance with the present disclosure.

Preparation of the Dough:

a) Recipes

Table 3 (see overleaf) provides the raw dough recipes.

RDB palm oil, Rapeseed oil and IE palm olein used in this cookie dough are the same as in Example 1.

Chocolate pieces are added in two sizes: Chunks (big "cubes", of length and width from 8 to 12 mm); and drops (just below 0.10 g each). Both contain the same chocolate ingredients (by decreasing order): sucrose, cocoa mass, cocoa butter, dextrose 2%, soy lecithin. Contains 26% fat.

TABLE 3 example 2
Recipe wt % INPUT/raw dough

| Dough process step | Ingredient name | Recipes | | |
| --- | --- | --- | --- | --- |
| | | Control C10 | Comparative C11 | Invention G |
| 1 | Sucrose (blend of icing/cristal EU No. 2) | 14.33% | 14.33% | 14.89% |
| 1 | Salt | 0.59% | 0.59% | 0.62% |
| 1 | RDB palm oil (25 kg blocs) | 14.74% | | 0.00% |
| 1 | Inter-Esterified palm olein | | | 10.47% |
| 1 | Rapeseed Oil Refined | | 14.74% | 2.22% |
| 2 | Water (cold) | 5.46% | 5.46% | 5.43% |
| 2 | Flavors | 0.10% | 0.10% | 0.10% |
| 2 | Ammonium hydrogen carbonate | 0.50% | 0.50% | 0.52% |
| 3 | WHEAT FLOUR T 55 | 29.75% | 29.75% | 31.20% |
| 3 | Acid baking powders (SODIUM BICARBONATE, Disodium diphosphate) | 0.60% | 0.60% | 0.63% |

TABLE 3-continued

| | | example 2 Recipe wt % INPUT/raw dough | | |
|---|---|---|---|---|
| 4 | CHOCOLATE-DROPS | 11.61% | 11.61% | 11.61% |
| 4 | CHOCOLATE-Chunks | 22.32% | 22.32% | 22.32% |
| | TOTAL raw dough | 100.00% | 100.00% | 100.00% |
| | % added fat | 14.74% | 14.74% | 12.69% |

| | Added oil nature | RDB palm oil | rapeseed | IE palm olein/rapeseed |
|---|---|---|---|---|
| Detail of ADDED fat in filling | Added oil composition | 100% | 100% | 83/17 |
| | Sat fat in the above added fat blend (1) | 50 | 7 | 39.4 |
| | % fatty acids with 12 or less carbons in the added fat blend (1) | 0.3 | 0.0 | 0.3 |
| | % trans fatty acids (1) | <1 | <1 | <1 |
| | Sat fat reduction | 0% | −86% | −21% |
| Bloom Resistance of chocolate pieces in baked cookie | Number of weeks before fat bloom at 18° C. | >14 | NA | >14 |
| | Number of weeks before fat bloom at 25° C. | >14 | <8 | >14 |

(1): in % of fatty acids methyl esters b) Dough Making

A Hobart mixer (2 kg) is used with a K-blade.

The hard fats are placed in a 45° C. stove for some minutes until they are semi-solids, i.e. soft enough (but still contain crystals) to be used in the next step.

Creaming: sucrose, salt and added fats are mixed together in the Hobart bowl (high speed; reduce speed if splashing out, like for rapeseed) for 3 minutes, which aerates the mix.

Water, Ammonium hydrogen carbonate and flavours are first premixed together and then added to the bowl and mixed for 2 min (medium speed).

Then flour+other baking powders are first premixed together and then added to the bowl and mixed for 3 min (medium speed). At this stage, dough temperature is about 25° C.

Finally, the chocolate pieces are added and mixed 50 sec (low speed).

Let the dough rest for 45 min at room temperature (about 18° C.).

Depending on flour properties and dough process, the skilled person will know how to modify the water addition and/or the ratio icing:crystal sucrose and baking powders in order to obtain the desired cookie spreading upon following baking.

c) Forming

Forming by classical wire-cut slices of rough dough of 26 g, with a diameter enabling to reach diameter target (below) after baking.

Baking:

In a static oven for about 9 minutes at 215° C. (time to be adjusted to reach a final moisture content of 2.7%). Weight after baking is about 23 g, and diameter 76±4 mm.

Cooling (first at air ambience, then with a cooling tunnel) at 25° C. (internal temperature), then flow wrap rapidly in transparent packaging (air tight).

Storage and stabilization is for 3 to 4 days at ~18±1° C.

Then, products enter the following keeping test to study the compatibility of the dough added fat with the chocolate pieces:

Store 2 series of wrapped cookies respectively at 18 and 25° C. isothermal (±0.5° C.).

Once a week, at least 6 cookies are monitored to determine whether bloom appears: the test is stopped when the bloom appears to the naked eye on the chocolate inclusions (with optimal natural light conditions). From our experience, in order to have no issue during the 9 months shelf life, the target is at least 12 weeks without bloom at 25° C. and no bloom up to 9 months at 18° C.

Conclusions for the Baked Chocolate Pieces Cookies:

After baking, several chocolate pieces per cookie (especially big chunks) are well visible, i.e. not covered by dough. This enables the evaluation as to whether bloom is forming.

For the control recipe with palm oil (C10), no bloom is seen on the chocolate pieces after 14 weeks at both 18 and 25° C.: chocolate pieces cookies have stable chocolate, in presence of palm oil. After 14 weeks, chocolate pieces are hard (as for normal dark chocolate) when eaten.

For comparative recipe C11 made with only native rapeseed oil as added fat, cookies were too spread after baking (larger diameter than target, less height). Upon storage, fat bloom appears before 8 weeks at 25° C. (failure to the bloom test). After 14 weeks of the keeping test, especially at 25° C., chocolate pieces are too soft compared to the control C10: the rapeseed oil migration into the chocolate has soften the chocolate and make it bloomed.

For recipe G according to the present disclosure (with the blend 83/17 of interesterified palm olein/rapeseed oil), added fat was reduced by 2% to reduce cookie dough spreading during baking and match cookie diameter target. After 14 weeks of the keeping test, recipe G enable vs control C10:

same stability against fat bloom similar hardness of chocolate pieces (very slightly less hard).

So, recipe G according to the invention enables 21% less sat fat in the added fat blend (based on weight of fatty acids), without negative impact on chocolate pieces stability (no bloom and no significant/excessive softening).

On the contrary, rapeseed oil alone is again not compatible with chocolate (same result as in Example 1).

Example 3

Crunchy round biscuits were prepared with different fats and oils and coated on their bottom with real chocolate i.e.

chocolate on one side only. Two recipes were used: one dark and one milk chocolate. The compatibilities of the fat blends with the chocolates were studied in various temperature keeping tests.
Recipes:
a) Biscuit Dough:
All recipes are the same except the nature of the added fat, which was changed to study its impact on chocolate fat bloom.

Milk chocolate recipe: 45.0% sugar, 15% cocoa mass, 11% cocoa butter, whey powder 10%, 9% skimmed milk powder, 4.4% CBE, 4.3% anhydrous milk fat, 0.6% lactose, 0.6% soy lecithin and 0.1% PGPR. Total fat=28.4%.

Chocolate is sourced from conventional chocolate makers, using traditional roll-refining and conching.

Emulsifier levels for both chocolate are indicative and can be optimised by the skilled person to reach a suitable

TABLE 4 recipes of the biscuit raw dough.

| | Recipe code | | | | | | | | |
|---|---|---|---|---|---|---|---|---|---|
| | H | I | J | K | L | M | N | O | P |
| | Recipe short name | | | | | | | | |
| | Bisco DA01 | RDB Palm oil | Palm olein | IE palm olein 100% | IE palm olein 87.5% | IE palm olein 78% | IE palm olein 67% | IE palm olein 56% | IE palm olein 0% |
| Fuji bisco DA01 | 14.56 | | | | | | | | |
| RDB Palm Oil | | 14.56 | | | | | | | |
| Palm Olein | | | 14.56 | | | | | | |
| IE palm olein | | | | 14.56 | 12.74 | 11.36 | 9.75 | 8.15 | |
| Rapeseed oil | | | | | 1.82 | 3.20 | 4.80 | 6.41 | 14.56 |
| Wheat flour | | | | | 61.52 | | | | |
| Sucrose EU No. 2 | | | | | 14.67 | | | | |
| Water | | | | | 5.47 | | | | |
| Whey powder | | | | | 1.43 | | | | |
| Glucose-Fructose syrup DE70% (77% dry solids) | | | | | 1.06 | | | | |
| Salt | | | | | 0.54 | | | | |
| Ammonium Bicarbonate Powder (BCA) | | | | | 0.37 | | | | |
| Sodium Bicarbonate Powder (BCS) | | | | | 0.36 | | | | |
| Acid sodium pyrophosphate Powder | | | | | 0.03 | | | | |
| Total | 100.00 | 100.00 | 100.00 | 100.00 | 100.00 | 100.00 | 100.00 | 100.00 | 100.00 |
| Rapeseed oil/added fat & oil | 0.0% | 0.0% | 0.0% | 0.0% | 12.5% | 22.0% | 33.0% | 44.0% | 100.0% |
| Sat fat in the above added fat blend (in % of total fatty acids) | 55.50 | 50 | 46 | 46 | 41.1 | 37.4 | 33.1 | 28.8 | 7 |
| Sum of saturated fatty acids with 20 carbon and more (in % of total fatty acids) | 0.5 | 0.6 | 0.6 | 0.6 | 0.7 | 0.7 | 0.7 | 0.8 | 1.0 |

The fats and oils used in these biscuit doughs (Bisco DA01, RDB palm oil, palm olein, IE palm olein and Rapeseed oil) are the same as in Example 1.

The main purpose of the trials in Example 3 is to study the compatibility of the IE palm olein, alone or blended with various amounts of rapeseed oil, with dark and milk chocolate.

All the fat blends added in H to P have less than 0.3% of fatty acids with 12 or less carbons, except the DA01 (control) which has 4.5%.
b) Chocolate:
Baked biscuits are bottomed with 27% chocolate (by weight of final product, i.e. baked biscuit+chocolate). All recipes are bottomed with both dark and milk chocolate except the Bisco DA01 which is not used with milk chocolate.

Dark Chocolate recipe: 44.5% sugar, 42% cocoa mass, 7.5% cocoa butter, 3% lactose, 2% anhydrous milk fat, 0.75% soy lecithin, 0.25% PGPR. Total fat=33%.

viscosity for the bottoming. The chocolate layer should be as even as possible on the biscuits.
Production of the Biscuits
a) Dough Making
The hard fats are placed in a 60° C. stove until they are fully melted. BCA is added to 50% of the water.
A Hobart mixer (model HSM20, 7 kg) is used with a K-blade.
Step 1:
Powders (sucrose, whey, salt, pyrophosphate) are premixed for 30 s.
50% of the water is added to glucose syrup, the water+BCA mixture, fats & oils. This is mixed for 10 s at speed 1, then speed 2 for 2 to 3 min.
Step 2:
Flour and BCS are added and then mixed at speed 1 for 3 minutes.
Dough moisture content is about 16%, and its temperature is 24° C. The dough then rests for 30 min at room temperature (about 20° C.).

Depending on flour properties and dough process, the skilled person will know how to modify the water addition and baking powders in order to obtain the desired biscuit after forming and baking.

b) Forming

Forming is by classical rotary moulding.

Each biscuit (rough dough) has a weight of 8.4 g.

c) Baking:

Baking is done in a continuous APV oven (direct gas) on a metal net, for 5.7 minutes. The temperature profile for the top is 150-220-170° C. and for bottom is 150-180-170° C. Exact temperature profile is to be adjusted (depending on oven) to reach a final moisture content of 1.6% and a golden yellow colour.

Weight after baking is 7.2 g, diameter is 56.5 mm and thickness 6.5 mm.

After baking, the biscuits are cooled at air ambiance (25° C.) for 30 to 60 min, then at 18 to 19° C. for 1 to 2 hours before air tight intermediate packaging.

The packed base biscuits are stored at 18° C.-19° C. for 2 to 3 days before bottoming (the time taken to make all the base biscuits).

d) Bottoming with Chocolate:

All of the biscuits are covered by the same chocolate batch on the same day, with the same chocolate lot and tempering settings.

The base biscuits are re-heated at 50° C. in a lab oven for 2 hours (to simulate a direct processing after baking, where all the fat is liquid). The base biscuits are stabilized for 30 to 60 min at room temperature (26 to 27° C.) before bottoming using a Sollich mini enrober.

The chocolate is tempered with a temper index of 4 to 6 (measured with a Sollich tempermeter E2).

The biscuit side that was in contact with the oven net is bottomed with 27% by weight of chocolate (vs final product weight). A flipping roll turns the biscuits, which then arrive on the cooling tunnel band with "chocolate on top".

The biscuits (covered with chocolate) are then cooled at 13° C. (air temperature) for 8 min.

The chocolate on biscuits is glossy (for all recipes) at the end of the cooling tunnel and after 3 days at 18° C.

Keeping Tests to Study the Chocolate Fat Bloom:

Then, each biscuit is placed in an adapted petri dish with a cover, with the chocolate covered side on top and the cover not touching the chocolate. Each petri dish is placed in air tight plastic pouches to avoid moisture pick-up by the biscuits. The plastic box avoids any packaging material touching the chocolate that would disturb any fat bloom appearance.

Biscuits are stored for 3 to 5 days at 18 to 19° C., before entering keeping tests at the following temperatures to study the compatibility of the added fat in the dough with the chocolate:

15° C.±0.5° C.
18° C.±0.5° C.
25° C.±0.5° C.
Warehouse (18.7 to 21.7° C. during the period)
Office (21 to 29° C. during the period)

Once a week, 5 biscuits are monitored to determine whether bloom has appeared on the chocolate by looking with the naked eye (with optimal natural light conditions). Looking at 5 biscuits enables outliers to be eliminated.

Chocolate is rated:
"+" if there is no fat bloom and it is glossy (with possibly some matt zones).
"0" if the chocolate is totally matt but not bloomed to the naked eye (under good natural light conditions). This is still acceptable, but less good.
"−" if it has some fat bloom, but it is of a low/medium intensity/visibility
"−−" if the fat bloom is severe (i.e. likely disgusting for most consumers), or if the chocolate is fully discoloured (and matt)/melted.

The rationale for choosing these temperatures is the following:
Typical storage temperatures in western countries for such biscuits are between 15 and 29° C., and mostly between 17 and 23° C.
It is assumed that the biscuits are not stored above 30° C., because it could give fat bloom not due to normal oil migration, but fat bloom due to temperature abuse i.e. the cocoa butter becomes too melted or fully melted, which recrystallizes upon cooling into big crystals and/or different crystal polymorphs).

Fat Bloom Results:

They are shown in table 5, after 6 months of keeping test. The different biscuit recipes are in line, combined with the dark chocolate layer in the first part of the table, and with the milk chocolate layer in the second part of the table.

TABLE 5

| | | fat bloom results of example 3, after 6 months | | | | |
|---|---|---|---|---|---|---|
| | | Storage temperature (° C.) | | | | |
| | | 15° C. | 18° C. | 25° C. | Warehouse (18.7-21.7° C.) | Office (21-29° C.) |
| | Dark chocolate | | | | | |
| Standard control | Bisco DA01 | + | + | − − (9) | + | + |
| Negative control | RDB Palm oil | + | + | − − (3) | − − (24) | − − (8) |
| Negative control | Palm olein | + | 0 | − − (3) | + | − − (8) |
| Invention | IE palm olein 100% | + | + | + | + | + |
| Invention | IE palm olein 87.5% | + | 0 | + | + | + |
| Invention | IE palm olein 78% | + | + | + | + | + |
| Invention | IE palm olein 67% | + | + | + | + | + |
| Invention | IE palm olein 56% | + | + | − (20) | + | 0 |
| Negative control | IE palm olein 0% | − (20) | − − (6) | − − (3) | − − (4) | − − (2) |
| | Control Dark Chocolate without biscuit | + | + | − (16) | + | − − (22) |
| | Milk chocolate | | | | | |
| Standard control | RDB Palm oil | 0 | + | − (15) | + | − − (15) |

TABLE 5-continued fat bloom results of example 3, after 6 months

| | | | | | | |
|---|---|---|---|---|---|---|
| Negative control | Palm olein | 0 | 0 | – (16) | 0 | – – (15) |
| Invention | IE palm olein 100% | 0 | + | + | + | + |
| Invention | IE palm olein 87.5% | 0 | + | + | + | + |
| Invention | IE palm olein 78% | + | + | + | + | + |
| Invention | IE palm olein 67% | + | + | + | + | + |
| Invention | IE palm olein 56% | 0 | + | + | + | + |
| Negative control | IE palm olein 0% | 0 | – – (9) | – – (6) | – – (14) | – – (12) |
| | Control Milk Chocolate without biscuit | 0 | + | 0 | 0 | 0 |

Legend:
Intensity of the bloom at the end of the 6 months
+    no fat bloom on chocolate (partially or totally shiny)
0    No fat bloom on chocolate, but totally matt. Acceptable.
–    medium fat bloom on chocolate visible (visible by consumer)
– –    Severe fat bloom; or fully discolored (and matt)/melted
(number)    number of weeks to first reach fat bloom (– or – –)

To illustrate the data in table 5, according to the legend, with an example: biscuits made with palm olein (Recipe J, Table 4) with dark chocolate are seen bloomed after 3 weeks at 25° C. as denoted by "(3)"; and after 6 months at 25° C., the fat bloom is severe as denoted by "– –". The same product stored 6 months at 15° C. is still at least partly shiny/glossy as denoted by "+"; and stored 6 months at 18° C., it is totally matt (but not bloomed to the naked eye) as said by "0".

Such biscuits usually have a shelf life of 6 to 12 months; they should not have fat bloom on the chocolate before the end of the shelf life.

Mean temperatures of 25° C. and above are reached only during summer, so that, when looking at the table, we can consider that no bloom after 8 weeks at 25° C. is acceptable, but below is risky i.e. a longer time before bloom is more desirable.

With Dark Chocolate

The 3 negative controls bloom very rapidly and cannot match the shelf life:
 palm oil and palm olein bloom at about the same time after 3 weeks at 25° C.
 100% rapeseed oil blooms in all conditions between 3 to 6 weeks (except after 20 weeks at 15° C.).

Standard control: Bisco DA01 (antibloom fat) is a standard control fat used in biscuits to avoid the fat bloom of dark chocolate at its contact. In our results, it does not bloom after 6 months in all conditions except after 9 weeks at 25° C. At 25° C., this is a good (but average) result.

All trials according to the invention were significantly more effective in preventing bloom: those with 100% to 67% of IE palm olein are not bloomed in any condition after 6 months and the one with 56% of IE palm olein blooms only at 25° C. and after 20 weeks, which is significantly better than the positive control DA01, and even better than the pure chocolate (not in contact with the biscuits).

With Milk Chocolate

Milk chocolate globally blooms less with the same biscuit recipes (Table 5): this is expected due to the higher level of milk fat and less visible colour contrast.

Biscuits covered with milk chocolate often use 100% RDB palm oil as added fat in the dough. This solution (Standard control) gives here average results, with some severe discolouration (and very matt appearance) after 15 weeks' storage. This is much worse than the same milk chocolate (tempered from the same trial) alone (i.e. not in contact with any biscuit), which does not bloom after 6 months.

Palm olein (negative control) gives slightly worse results, due to its lower saturated fat and more liquid oil vs RDB palm oil:
 less good results at 18 to 20° C. and in warehouse (matt chocolate, i.e. border line/not qualitative),
 chocolate also fully discoloured after 15 weeks at office (unacceptable).

The IE palm olein gives no bloom for alt conditions, whether it is used pure or diluted with up to 44% rapeseed oil.

On the contrary, the product made with 100% rapeseed oil (negative control) blooms at 18° C. in warehouse, and also fully discolours and melts at 25° C. at office.

For Both Dark and Milk Chocolate

Note the significant difference between the standard palm olein (which blooms rapidly) and the IE palm olein which does not bloom (although having the same fatty acid profile and the same saturated fat content). This is particularly significant for dark chocolate at 25° C.: palm olein blooms after 3 weeks, when IE palm olein does not bloom after 6 months. Blending the IE palm olein with up to 44% rapeseed oil for dark and milk chocolate gives notable results on fat bloom:
 better than the standard controls, despite having much less saturated fat
 better than the negative controls, despite having much less saturated fat (100% rapeseed oil excluded).
 Better than the chocolate alone (not in contact with the biscuits).

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A composite comestible product comprising distinct first and second components,
 wherein the first component has a total fat content comprising a randomly interesterified fat, the randomly interesterified fat having a saturated fat content of from 35 to 55 wt % by weight of the randomly interesterified fat and less than 1 wt % saturated fatty acids having 20 or more carbon atoms by weight of the randomly interesterified fat, wherein the total fat content of the first component comprises from 20 to 50 wt % saturated fat and less than 3 wt % trans fatty acids by weight of the total fat content, wherein the total fat content of the first component further comprises a liquid oil in an amount of from 10 to 70 wt % by weight of the total fat content, the liquid oil having a saturated fat content of less than 20 wt % by weight of the liquid oil and a solid fat content of less than 5 wt % at 20° C., wherein the randomly interesterified fat is present in a total amount of from 30 to 90 wt % by weight of the total fat content of the first component, and wherein the second component is a chocolate component comprising one or more sources of cocoa butter (CB) or cocoa butter equivalent (CBE).

2. The composite comestible product according to claim 1, wherein the randomly interesterified fat and the liquid oil are present in a total amount of at least 80 wt % by weight of the total fat content.

3. The composite comestible product according to claim 1, wherein the second component forms at least a portion of an outer surface of the comestible product, the outer surface having a colour and/or size such that the presence of any fat bloom thereon would be readily discernible.

4. The composite comestible product according to claim 1, wherein the first component forms a bakery portion of the composite comestible product.

5. The composite comestible product according to claim 4, wherein the first component forms a bakery portion, wherein the bakery portion has a total fat content of from 9 to 23 wt % by weight of the bakery portion.

6. The composite comestible product according claim 1, wherein the first component and the second component form first and second adjacent layers respectively.

7. The composite comestible product according to claim 1, wherein:
(i) the first component forms a continuous bakery portion, and wherein the second component forms one or more discrete inclusions; or
(ii) the second component forms a continuous portion, and the first component forms one or more discrete bakery inclusions.

8. The composite comestible product according to claim 1, wherein the second component has a total content of $SU_2$ and $U_3$ triglycerides of less than 10 wt % based on the total triglycerides present in the second component.

9. A composite comestible product comprising distinct first and second components,
wherein the first component has a total fat content comprising a randomly interesterified fat, the randomly interesterified fat having a saturated fat content of from 35 to 55 wt % by weight of the randomly interesterified fat and less than 3 wt % saturated fatty acids having 20 or more carbon atoms by weight of the randomly interesterified fat, wherein the total fat content of the first component comprises from 20 to 50 wt % saturated fat and less than 3 wt % trans fatty acids by weight of the total fat content, wherein the total fat content of the first component further comprises a liquid oil in an amount of from 10 to 70 wt % by weight of the total fat content, the liquid oil having a saturated fat content of less than 20 wt % by weight of the liquid oil and a solid fat content of less than 5 wt % at 20° C., wherein the randomly interesterified fat is present in a total amount of from 30 to 90 wt % by weight of the total fat content of the first component, wherein the second component is a chocolate component comprising one or more sources of cocoa butter (CB) or cocoa butter equivalent (CBE); and wherein the total fat content does not include any hydrogenated oil.

10. The composite comestible product according to claim 9, wherein the first component forms a filling of the composite comestible product.

11. The composite comestible product according to claim 9, wherein the randomly interesterified fat and the liquid oil are present in a total amount of at least 80 wt % by weight of the total fat content.

12. The composite comestible product according to claim 9, wherein the second component forms at least a portion of an outer surface of the comestible product, the outer surface having a colour and/or size such that the presence of any fat bloom thereon would be readily discernible.

13. The composite comestible product according to claim 9, wherein the first component forms a bakery portion of the composite comestible product.

14. The composite comestible product according to claim 13, wherein the first component forms a bakery portion, wherein the bakery portion has a total fat content of from 9 to 23 wt % by weight of the bakery portion.

15. The composite comestible product according claim 9, wherein the first component and the second component form first and second adjacent layers respectively.

16. The composite comestible product according to claim 9, wherein:
(i) the first component forms a continuous bakery portion, and wherein the second component forms one or more discrete inclusions; or
(ii) the second component forms a continuous portion, and the first component forms one or more discrete bakery inclusions.

17. The composite comestible product according to claim 9, wherein the second component has a total content of $SU_2$ and $U_3$ triglycerides of less than 10 wt % based on the total triglycerides present in the second component.

18. The composite comestible product according to claim 1, wherein the first component forms a filling of the composite comestible product.

* * * * *